US008638987B2

(12) United States Patent
Choi et al.

(10) Patent No.: US 8,638,987 B2
(45) Date of Patent: Jan. 28, 2014

(54) IMAGE-BASED HAND DETECTION APPARATUS AND METHOD

(75) Inventors: Seung-Min Choi, Daejeon (KR); Jae-Chan Jeong, Daejeon (KR); Jae-Il Cho, Daejeon (KR); Dae-Hwan Hwang, Daejeon (KR)

(73) Assignee: Electonics and Telecommunications Research Institute, Daejeon (KR)

( * ) Notice: Subject to any disclaimer, the term of this patent is extended or adjusted under 35 U.S.C. 154(b) by 62 days.

(21) Appl. No.: 13/241,119

(22) Filed: Sep. 22, 2011

(65) Prior Publication Data

US 2012/0087543 A1    Apr. 12, 2012

(30) Foreign Application Priority Data

Oct. 6, 2010 (KR) .................. 10-2010-0097227

(51) Int. Cl.
*G06K 9/00* (2006.01)
(52) U.S. Cl.
USPC ............ 382/103; 382/190; 382/209; 382/216
(58) Field of Classification Search
USPC .................................. 382/103, 190, 209, 216
See application file for complete search history.

(56) References Cited

U.S. PATENT DOCUMENTS

| 5,594,469 | A * | 1/1997 | Freeman et al. | 345/158 |
|---|---|---|---|---|
| 6,624,833 | B1 * | 9/2003 | Kumar et al. | 715/863 |
| 7,489,806 | B2 * | 2/2009 | Mohri et al. | 382/107 |
| 7,616,784 | B2 * | 11/2009 | Kocher | 382/115 |
| 8,023,698 | B2 * | 9/2011 | Niwa et al. | 382/103 |
| 8,099,462 | B2 * | 1/2012 | Sheng et al. | 709/204 |
| 8,379,986 | B2 * | 2/2013 | Tsurumi | 382/203 |
| 8,401,333 | B2 * | 3/2013 | Miyakawa et al. | 382/284 |
| 2004/0063480 | A1 * | 4/2004 | Wang | 463/8 |
| 2005/0041839 | A1 * | 2/2005 | Saitou et al. | 382/103 |
| 2005/0232467 | A1 * | 10/2005 | Mohri et al. | 382/103 |
| 2005/0232482 | A1 * | 10/2005 | Ikeda et al. | 382/167 |
| 2007/0070037 | A1 * | 3/2007 | Yoon | 345/156 |
| 2008/0215184 | A1 * | 9/2008 | Choi et al. | 700/259 |
| 2008/0232715 | A1 * | 9/2008 | Miyakawa et al. | 382/284 |
| 2009/0073117 | A1 * | 3/2009 | Tsurumi et al. | 345/158 |
| 2009/0092336 | A1 * | 4/2009 | Tsurumi | 382/294 |
| 2009/0268040 | A1 * | 10/2009 | Campbell et al. | 348/207.1 |
| 2010/0291968 | A1 * | 11/2010 | Ander et al. | 455/556.1 |
| 2010/0299355 | A1 * | 11/2010 | Shiiyama et al. | 707/769 |

(Continued)

FOREIGN PATENT DOCUMENTS

| KR | 1020060053348 A | 5/2006 |
|---|---|---|
| KR | 1020070061231 A | 6/2007 |
| KR | 1020080029222 A | 4/2008 |

*Primary Examiner* — Jayesh A Patel
*Assistant Examiner* — Iman K Kholdebarin

(57) ABSTRACT

An image-based hand detection apparatus includes a hand image detection unit for detecting a hand image corresponding to a shape of a hand clenched to form a fist from an image input. A feature point extraction unit extracts feature points from an area, having lower brightness than a reference value, in the detected hand image. An image rotation unit compares the feature points of the detected hand image with feature points of hand images stored in a hand image storage unit, and rotates the detected hand image or the stored hand images. A matching unit compares the detected hand image with the stored hand images and generates a result of the comparison. If at least one of the stored hand images is matched with the detected hand image, a hand shape recognition unit selects the at least one of the stored hand images as a matching hand image.

16 Claims, 8 Drawing Sheets

(56) References Cited

U.S. PATENT DOCUMENTS

| | | | |
|---|---|---|---|
| 2010/0315547 A1* | 12/2010 | Takada | 348/416.1 |
| 2010/0329511 A1* | 12/2010 | Yoon et al. | 382/103 |
| 2011/0044554 A1* | 2/2011 | Tian et al. | 382/255 |
| 2011/0110560 A1* | 5/2011 | Adhikari | 382/103 |
| 2011/0268365 A1* | 11/2011 | Lou et al. | 382/224 |
| 2012/0087543 A1* | 4/2012 | Choi et al. | 382/103 |
| 2012/0242566 A1* | 9/2012 | Zhang et al. | 345/156 |
| 2012/0300980 A1* | 11/2012 | Yokono | 382/103 |

* cited by examiner

0°  45°  90°

IMAGE-BASED HAND DETECTION APPARATUS AND METHOD

CROSS REFERENCE TO RELATED APPLICATION

This application claims the benefit of Korean Patent Application No. 10-2010-0097227, filed on Oct. 6, 2010, which is hereby incorporated by reference in its entirety into this application.

BACKGROUND OF THE INVENTION

1. Technical Field

The present invention relates generally to an image-based hand detection apparatus and method and, more particularly, to a hand detection apparatus and method, which detect hands based on images in Human Computer Interaction (HCI) technology.

2. Description of the Related Art

In Human Computer Interaction (HCI) or Human Robot Interaction (HRI) technology, the detection of areas of a user exhibiting a relatively high detection rate based on images is face detection based on facial areas. The reason for this is that features points such as the eyes, nose, and mouth are present on a human face.

However, in omega detection, body detection, hand detection, etc. which have become issues in user interface methods, any background may appear behind a subject unlike in face detection, and various shapes of the subject are assumed, so that the rate of success in detection is low and the probability of erroneous detection is high.

To date, methods, such as the detection of skin color, the detection of motions, and the attachment of a marker, have been mainly used to detect hands, but products that use a remote control equipped with an acceleration sensor are mainly being utilized at present due to problems such as lighting, a moving background, the inconvenience of wearing a maker, and a low detection rate.

Generally, since a hand is composed of several tens of joints, the shape of the hand may assume various shapes even if the shape of the hand obtained when the hand is rotated around a direction perpendicular to a camera as the direction of a shaft is excluded, and thus it is not easy to apply the shapes of the hand to a classifier based on feature points. Therefore, there have been used a method of removing a background using color information, distance information or the like, and thereafter finally determining the shape of the hand by applying an Adaboost algorithm or by exploiting edge information or the like. However, even this method is disadvantageous in that it is not easy to exhibit a reliable detection rate because it is difficult to exclude the influence of lighting and remove a background appearing between the fingers.

SUMMARY OF THE INVENTION

Accordingly, the present invention has been made keeping in mind the above problems occurring in the prior art, and an object of the present invention is to provide an image-based hand detection apparatus and method, which can obtain a higher detection success rate when detecting a hand from an image.

Another object of the present invention is to provide an image-based hand detection apparatus and method, which can be used for applications that recognize hand movements and issue commands corresponding to the hand movements in computers, vehicles, game consoles, and household electric appliances including televisions (TVs).

In accordance with an aspect of the present invention to accomplish the above objects, there is provided an image-based hand detection apparatus, including a hand image detection unit for detecting a hand image corresponding to a shape of a hand clenched to form a fist from an image input from a camera, a feature point extraction unit for extracting feature points from an area, having lower brightness than a reference value, in the hand image detected by the hand image detection unit, an image rotation unit for comparing the feature points of the detected hand image with feature points of hand images stored in a hand image storage unit, and then rotating the detected hand image or the stored hand images, a matching unit for comparing the detected hand image with the stored hand images and then generating a result of the comparison, and a hand shape recognition unit for, if at least one of the stored hand images is matched with the detected hand image as the result of the comparison by the matching unit, selecting the at least one of the stored hand images as a matching hand image.

Preferably, the hand image detection unit may set a window of an M×N size on a pixel unit for each frame of the input image, and detects a hand image of the M×N size.

Preferably, the hand image detection unit may determine whether a hand is included in the M×N size window of the input image, and if a hand is not included in the M×N size window, reduce the size of the input image step by step for detecting the hand image in the M×N size window.

Preferably, the feature point extraction unit may extract a number, locations, and angles of edges for the area having lower brightness than the reference value in the detected hand image, as the feature points of the detected hand image. As the detected image corresponds to a shape of a hand clenched to form a fist, the edges may be extracted efficiently and very useful to recognize hands. The edges correspond to areas with lower brightness than the reference value in the detected hand image. Generally, the edges correspond to areas between fingers.

Preferably, the hand shape recognition unit may recognize a front portion of the shape of the hand clenched to form a fist.

Preferably, the image-based hand detection apparatus may further include a hand shape classifier for, if a hand image identical to the detected hand image is not present in the stored hand images as the result of the comparison by the matching unit, registering the detected hand image. That is, if all the stored hand images are not matched with the detected hand image as the result of the comparison by the matching unit, the hand shape classifier registers the detected hand image.

Preferably, the hand shape classifier may compare a plurality of hand images with images including no hands, calculate feature values of a hand shape included in each of the hand images, and classify each hand shape based on the calculated feature values. In this case, the hand shape classifier may be configured such that if an identical hand shape is present in hand shapes included in the respective hand images, weights are applied to feature values of the identical hand shape, and then feature values are recalculated. The identical hand shapes don't need to be exactly identical with one another, but may have the matching result value of the comparison within a predetermined threshold value.

Preferably, the image-based hand detection apparatus may further include a movement recognition unit for recognizing hand movements from one or more hand shapes recognized by the hand shape recognition unit and recognizing commands corresponding to the recognized hand movements.

In accordance with another aspect of the present invention to accomplish the above objects, there is provided an image-based hand detection method, including detecting a hand image corresponding to a shape of a hand clenched to form a fist from an image input from a camera, and generating a detected hand image, extracting feature points from an area, having lower brightness than a reference value, in the detected hand image, comparing the feature points of the detected hand image with feature points of hand images stored in a hand image storage unit to rotate the detected hand image or the stored hand images, and comparing the detected hand image with the stored hand images to generate a result of the comparison, and if a hand image identical to the detected hand image is present in the stored hand images as the result of the comparison, selecting the identical hand image as a matching hand image. That is, if at least one of the stored hand images is matched with the detected hand image as the result of the comparison by the matching unit, the image-based hand detection method selects the at least one of the stored hand images as a matching hand image.

Preferably, the detecting the hand image may include setting a window of an M×N size on a pixel unit for each frame of the input image, wherein a hand image of the M×N size is detected.

Preferably, the detecting the hand image may further include determining whether a hand is included in the M×N size window of the input image, and if a hand is not included in the M×N size window, reducing the input image within a range in which a hand is included in the M×N size window.

Preferably, the extracting the feature points may be configured to extract a number, locations, and angles of edges for the area having lower brightness than the reference value in the detected hand image, as the feature points of the detected hand image.

Preferably, the selecting the identical hand image as the matching hand image may be configured to recognize a front portion of the shape of the hand clenched to form a fist.

Preferably, the image-based hand detection method may further include, if a hand image identical to the detected hand image is not present in the stored hand images as the result of the comparison, inputting the detected hand image to a hand shape classifier and then registering the detected hand image. That is, if all the stored hand images are not matched with the detected hand image as the result of the comparison by the matching unit, the image-based hand detection method registers the detected hand image.

Preferably, the registering the hand image may include comparing a plurality of hand images with images including no hands, and calculating feature values of a hand shape included in each of the hand images, setting the calculated feature values as feature values of the hand shape included in each of the hand images, and classifying each hand shape based on the feature values of the hand shapes.

Preferably, the image-based hand detection method may further include, if an identical hand shape is present in hand shapes included in the respective hand images, applying weights to feature values of the identical hand shape, and then recalculating feature values, and setting the recalculated feature values as final feature values of the identical hand shape.

Preferably, the image-based hand detection method may further include recognizing hand movements from hand shapes included in one or more hand images selected as the matching hand image, and recognizing commands corresponding to the hand movements.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described with reference to the attached drawings.

The present invention relates to an image-based hand detection apparatus and method, and is intended to propose the detection of a specific hand shape, which has less variation, is not influenced by a background and has a designated form, among various hand shapes. In particular, the shape of a hand clenched to form a fist is applied to the present invention. The shape of the hand clenched to form a fist is a hand shape that can also be easily taken even in games or user interactions and that can guarantee a reliable detection rate.

Figure 1:
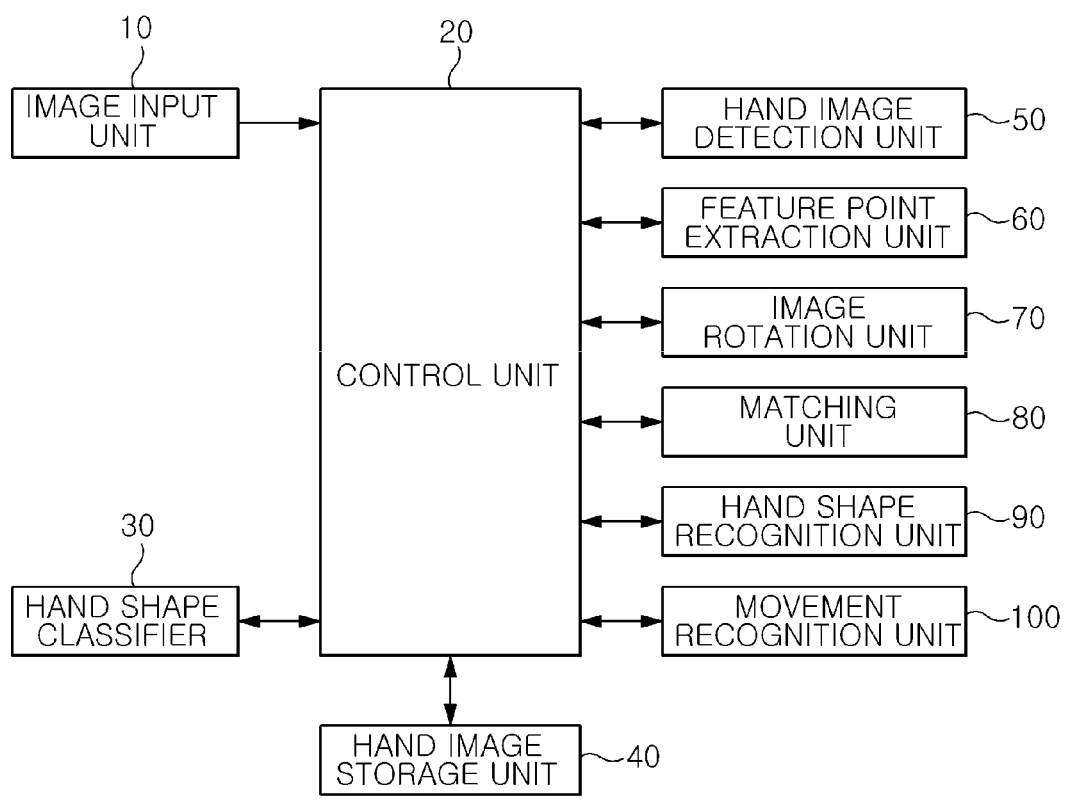
FIG. 1 is a block diagram showing the construction of an image-based hand detection apparatus according to the present invention.

FIG. 1 is a block diagram showing the construction of an image-based hand detection apparatus according to the present invention.

As shown in FIG. 1, an image-based hand detection apparatus according to the present invention includes an image input unit 10, a control unit 20, a hand shape classifier 30, a hand image storage unit 40, a hand image detection unit 50, a feature point extraction unit 60, an image rotation unit 70, a matching unit 80, a hand shape recognition unit 90, and a movement recognition unit 100. Here, the control unit 20 controls the operations of the individual units.

The image input unit 10 is a means for receiving captured images, and may correspond to a camera or the like. The images input to the image input unit 10 are basically stored in the hand image storage unit 40.

The hand shape classifier 30 is a means for classifying hand shapes from the plurality of images input to the image input unit 10. In this case, the hand shape classifier 30 compares hand images with images including no hands, extracts the feature values of each hand shape, and classifies each hand shape from the extracted feature values.

In this case, if there are identical hand shapes among the plurality of hand shapes, the shape classifier 30 applies weights to the feature values of those hand shapes, and then sets the feature values of the identical hand shapes.

The hand shape classifier 30 classifies the final hand shapes using a classification procedure that it performs several times, and information about the hand shapes classified by the hand shape classifier 30 is stored in the hand image storage unit 40.

The hand image detection unit 50 is a means for, when an image is input to the image input unit 10, detecting a hand image from the input image. In this case, the hand image detection unit 50 detects the shape of a hand clenched to form a fist so as to guarantee the detection rate of a bare hand without wearing a marker. The reason for using the shape of the hand clenched to form a fist is that when the hand is clenched to form a fist, a background does not appear between the fingers, and a dark portion appears, so that a number of feature points identical to the number of fingers are obtained.

In this case, the hand image detection unit 50 sets an M×N window on a pixel unit for each frame of the currently input image, determines whether a hand is included in the window, and detects a hand image while reducing the image to an image of a predetermined size including a hand.

In this way, since the captured images may contain hands of various sizes, the hand image detection unit 50 detects a larger hand from a reduced image and a smaller hand from a comparatively less reduced image.

Examples of a hand image detected by the hand image detection unit 50 will be described with reference to FIGS. 2A to 2D.

Meanwhile, when a hand image is detected by the hand image detection unit 50, the feature point extraction unit 60 extracts feature points from the detected hand image. In this case, the feature point extraction unit 60 extracts feature points of the shape of a hand clenched to form a fist from the detected hand image. As an example, the feature point extraction unit 60 may extract the number, locations, and angles of edges for an area having lower brightness than a reference value in the detected hand image, as the feature points of the detected hand image.

Embodiments of an operation of extracting the feature points of a hand image using the feature point extraction unit 60 will be described with reference to FIGS. 3A to 3D.

When the features points of a hand image are extracted by the feature point extraction unit 60, the image rotation unit 70 rotates the detected hand image around the area that includes the feature points. Of course, the image rotation unit 70 rotates the detected hand image while comparing the feature points of the hand image with the feature points of hand images stored in the hand image storage unit 40.

In this case, the image rotation unit 70 may also rotate the hand images stored in the hand image storage unit 40 rather than the detected hand image while comparing the feature points of the detected hand image with the feature points of the stored hand images.

The matching unit 80 matches the hand image rotated by the image rotation unit 70 with the hand images stored in the hand image storage unit 40.

In this case, when the angle of the detected hand image is not identical to those of the hand images stored in the hand image storage unit 40, the matching unit 80 may adjust a rotating angle of the relevant hand image using the image rotation unit 70.

As a result of the matching by the matching unit 80, if a hand image identical to the detected hand image is present in the stored hand images, the hand shape recognition unit 90 recognizes the shape of the relevant hand; otherwise, the shape of the relevant hand is registered in the hand shape classifier 30.

Meanwhile, if a plurality of hand shapes are recognized by the hand shape recognition unit 90, the movement recognition unit 100 recognizes hand movements from the recognized hand shapes. Embodiments of an operation of recognizing hand movements using the movement recognition unit 100 will be described in detail later with reference to FIGS. 4 and 5.

FIGS. 2A to 2D are diagrams illustrating examples of a hand image applied to the present invention.

As shown in FIGS. 2A to 2D, the shape of a hand clenched to form a fist may be detected as different images depending on the direction, angle, and the like, rather than being represented by any one shape.

Figure 2A:
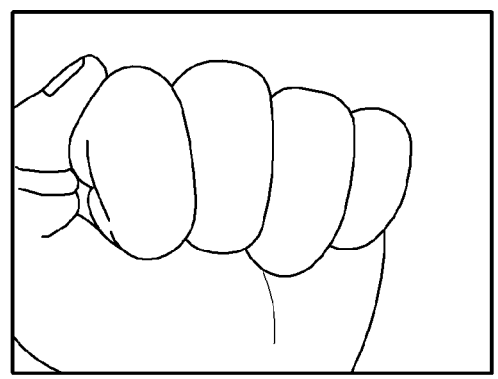
FIGS. 2A to 2D are diagrams showing examples of a hand image applied to the present invention.
Figure 2B:
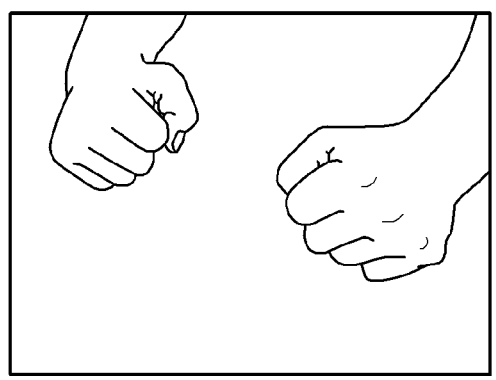
Figure 2C:
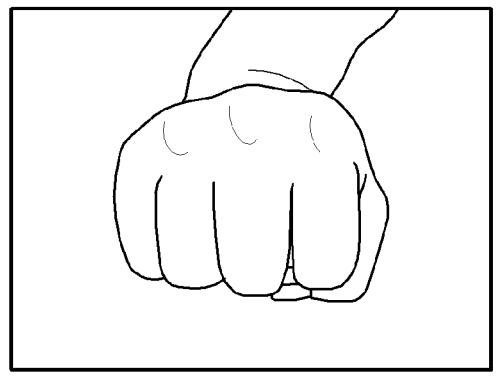
Figure 2D:
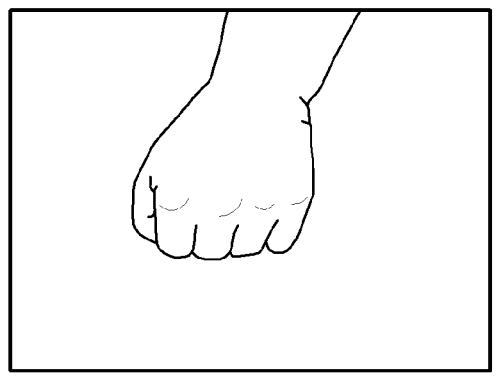

In other words, a hand image may be any one of an image obtained by detecting the palm of the hand when it is clenched to form a fist, as shown in FIG. 2A, an image obtained by detecting the sides of both hands when they are obliquely clenched to make a fist, as shown in FIG. 2B, an image obtained by detecting the front of the hand when it is clenched to form a fist, as shown in FIG. 2C, and an image obtained by detecting the back of the hand when it is clenched to form a fist, as shown in FIG. 2D.

FIGS. 3A to 3D illustrate an operation of extracting feature points from each hand image to correspond to the hand images of FIGS. 2A to 2D.

In particular, the embodiments of FIGS. 3A to 3D show that the area including the feature points in each of the hand images of FIGS. 2A to 2D is represented by a rectangle.

Figure 3A:
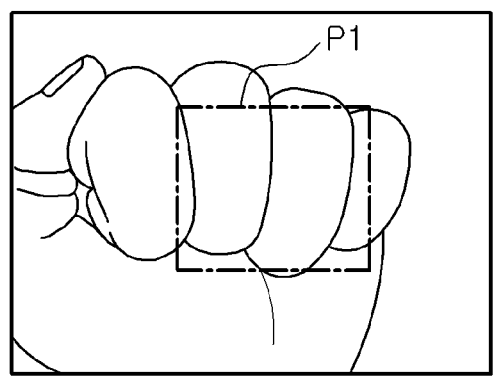
FIGS. 3A to 3D are diagrams showing the operations of extracting feature points from the hand images of FIGS. 2A to 2D.
Figure 3B:
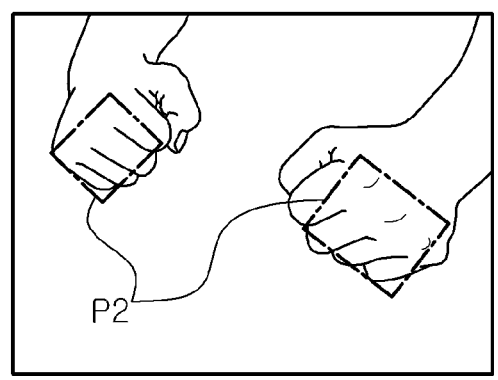
Figure 3C:
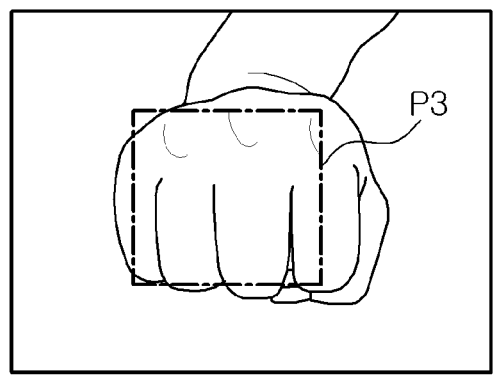
Figure 3D:
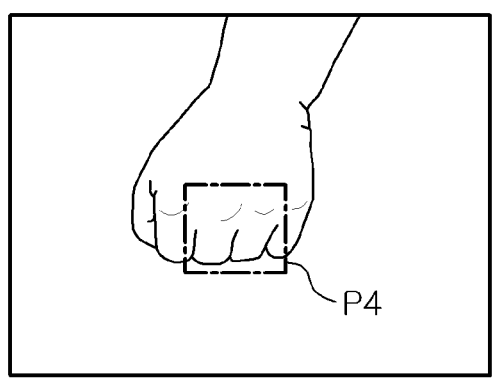

First, FIG. 3A shows that feature points are extracted from area P1 of the hand image of FIG. 2A. Further, FIG. 3B shows that feature points are extracted from areas P2 of the hand image of FIG. 2B. FIG. 3C shows that feature points are extracted from area P3 of the hand image of FIG. 2C. Finally, FIG. 3D shows that feature points are extracted from area P4 of the hand image of FIG. 2D.

In this case, the image rotation unit 70 can rotate the relevant image around such a rectangular area.

Figure 4:
FIGS. 4 and 5 are diagrams showing embodiments of the recognition of hand movements.
Figure 5:
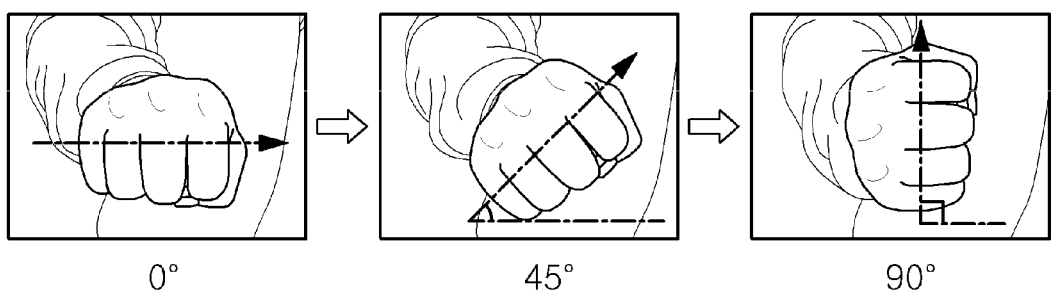

FIGS. 4 and 5 are diagrams illustrating embodiments of the recognition of hand movements.

FIG. 4 illustrates hand shapes recognized by the hand shape recognition unit 90 as time elapses, and FIG. 5 illustrates examples in which the movement recognition unit 100 recognizes hand movements from the hand shapes of FIG. 4.

In other words, on the basis of a first hand shape in FIGS. 4 and 5, a second hand shape is obtained by rotating the first hand shape to the right by an angle of 45 degrees, and a third hand shape is obtained by rotating the second hand shape to the right by an angle of 45 degrees.

Therefore, the movement recognition unit 100 may recognize hand movements from variations among the first, second and third hand shapes, and then recognize commands corresponding to the recognized hand movements, respectively.

For example, the movement recognition unit 100 calculates a procedure for maintaining a fist in a horizontal state and then standing the fist at an angle of 90 degrees using coordinates corresponding to hand detection results, and may then recognize the command 'selection'.

The results of detection obtained in this way can be applied to the recognition of various movements, and commands such as menu selection or the like on a User Interface (UI) can also be issued using information about the direction of the hand in the results of the detection.

The operation of the present invention having the above construction will be described below.

Figure 6:
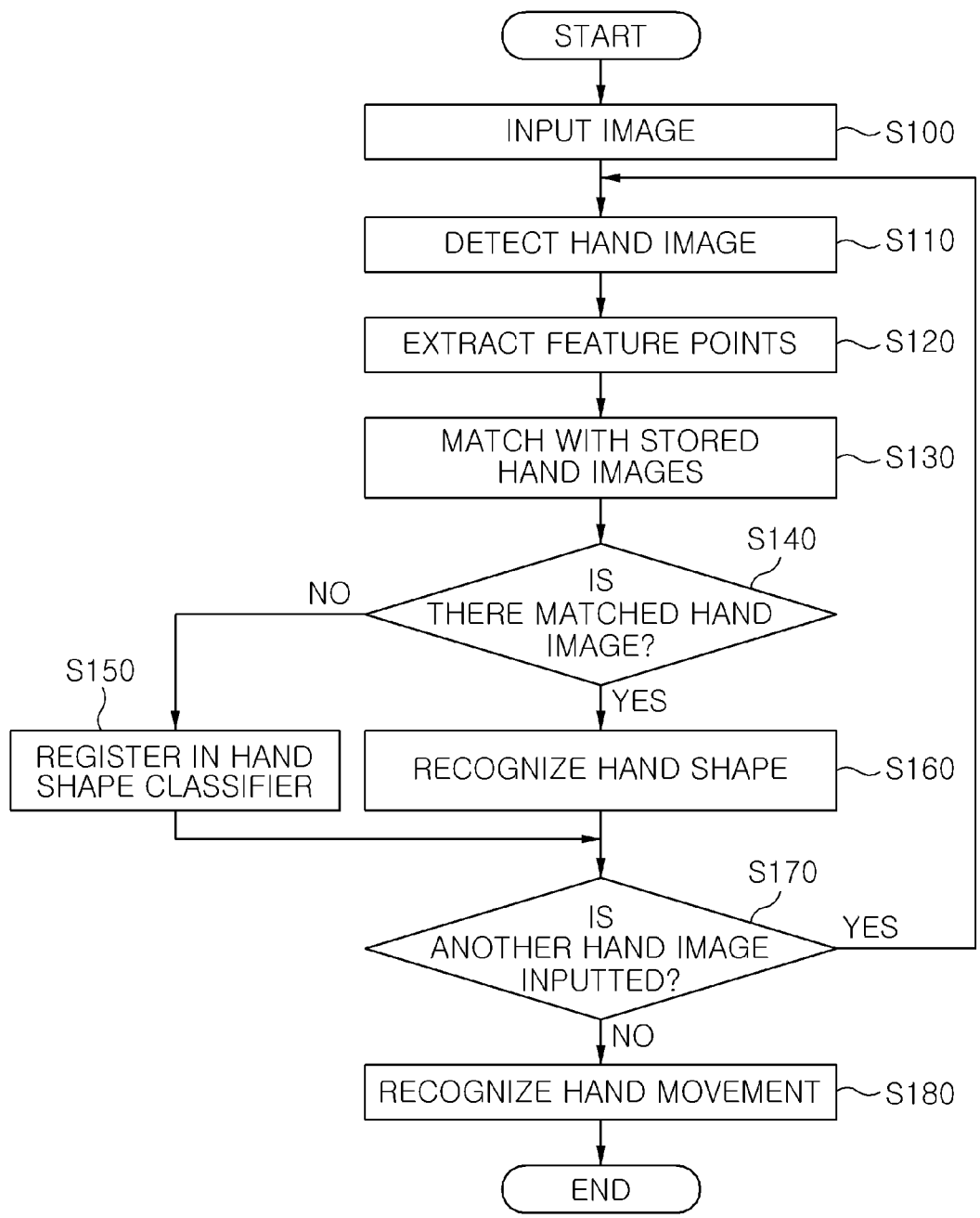
FIG. 6 is a flowchart showing the operating flow of an image-based hand detection method according to the present invention.

FIG. 6 is a flowchart showing the operating flow of an image-based hand detection method according to the present invention.

As shown in FIG. 6, when an image is input to the image input unit 10 of the image-based hand detection apparatus at step S100, the hand image detection unit 50 detects a hand image from the image, which was input at step S100, at step S110.

In this case, the hand image detection unit 50 sets an M×N window on a pixel unit, and then determines whether a hand is included in the window. This procedure is performed on all pixels of the frame of the currently input image.

The hand image detection unit 50 repeats the same procedure while reducing the size of the input image, and then completes the detection of the current image if the size of the image is reduced to a preset minimum size. In this way, since there are various sizes of the hand included in captured images, a larger hand is detected in a reduced image, and a smaller hand is detected in a comparatively less reduced image.

Thereafter, at step S120, the feature point extraction unit 60 extracts the feature points of the hand image detected at step S110.

The matching unit 80 matches the hand image detected at step S110 with the hand images stored in the hand image storage unit 40 while comparing the feature points of the detected hand image with the feature points of the stored hand images at step S130.

In this case, when the angle of the detected hand image is not identical to those of the hand images stored in the hand image storage unit 40, the matching unit 80 may rotate a relevant hand image using the image rotation unit 70.

Here, the image rotation unit 70 may rotate either the detected hand image, the feature points of which have been extracted at step S120, or the hand images stored in the hand image storage unit 40. In this case, the image rotation unit 70 rotates the hand images while comparing the locations of the feature points of the respective hand images.

Meanwhile, as a result of the matching at step S130, if a hand image identical to the detected hand image is present in the stored hand images at step S140, the hand shape recognition unit 90 recognizes the relevant hand shape of the hand image at step S160.

In contrast, as the result of the matching at step S130, if there is no hand image identical to the detected hand image at step S140, the hand shape recognition unit 90 registers the relevant hand shape in the hand shape classifier 30 at step S150.

Thereafter, if another hand image is input at step S170, steps S100 to S160 are repeatedly performed, whereas if another hand image is not input any more, the movement recognition unit 100 recognizes hand movements from the hand shapes recognized at steps S100 to S160, and then terminates the relevant operations at step S180.

Figure 7:
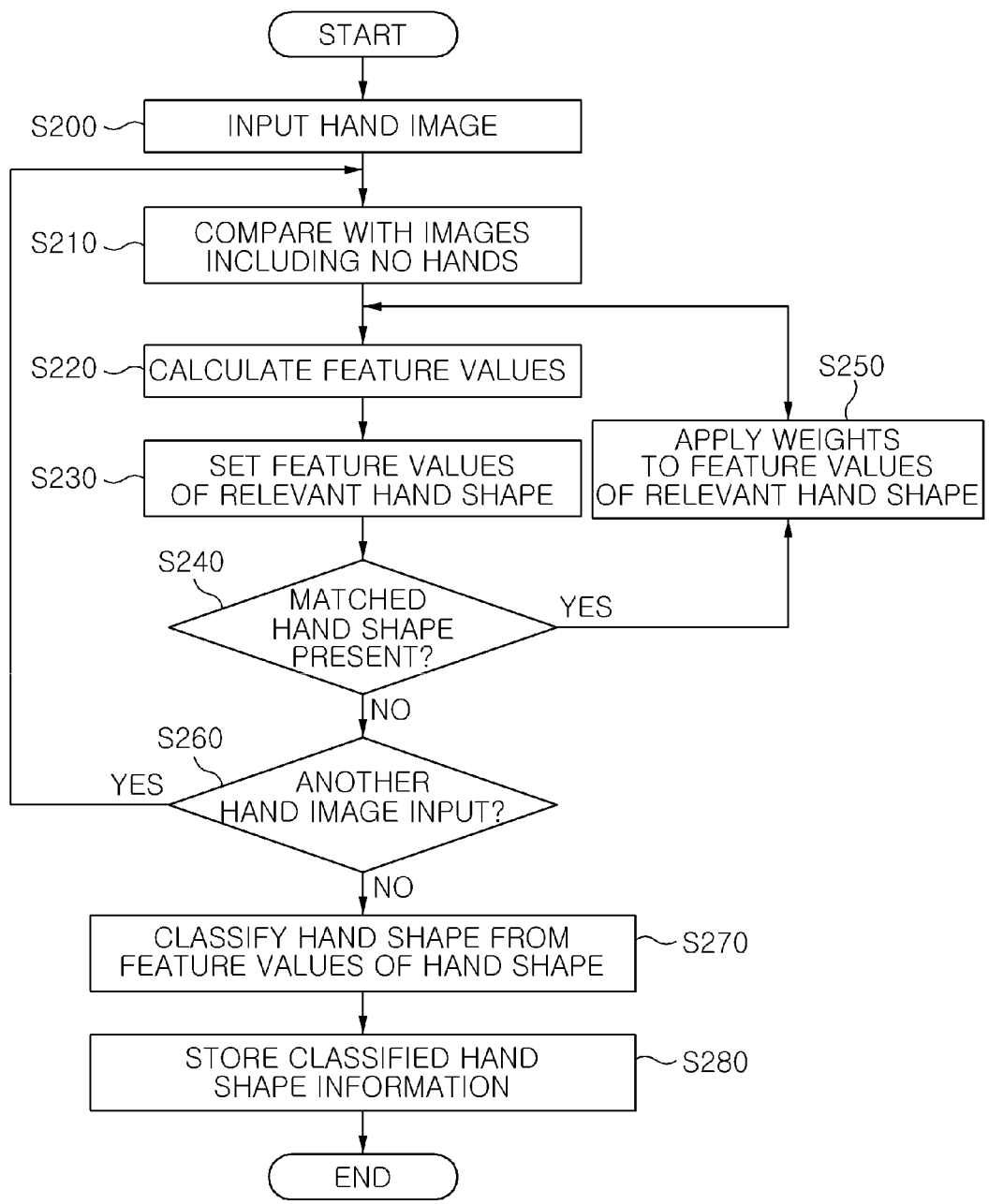
FIG. 7 is a flowchart showing the operating flow of the classification of hand shapes in the hand detection method.

FIG. 7 is a flowchart showing the operating flow of an operation of classifying hand shapes in the hand detection method.

As shown in FIG. 7, when a hand image is input at step S200, the hand shape classifier 30 of the image-based hand detection apparatus according to the present invention compares the hand image with images of the same size, which do not include hands at step S210. In this case, the hand shape classifier 30 acquires as many hand images and images including no hands as possible, and compares those images.

If the sizes of the hand images are different from those of the images including no hands, the sizes of the respective images are adjusted to an M×N size. Of course, the plurality of images stored in the hand image storage unit 40 are also images of the same M×N size.

In this case, the hand shape classifier 30 calculates the feature values of each hand image, based on the result of the comparison at step S210, at step S220, and sets the calculated feature values as the feature values of a relevant hand shape at step S230.

Thereafter, if there is a hand shape identical to the hand shape of the input hand image at step S240, weights are applied to the previously set feature values of the hand shape at step S250, and feature values are recalculated at step S220, and the recalculated feature values are set as the features of the relevant hand shape at step S230.

The hand shape classifier 30 repeats steps S220 to S250 for the same hand shape, and then sets the final feature values of the hand shape.

Meanwhile, when another hand image is input at step S260, the hand shape classifier 30 repeats steps S210 to S250, and then sets the feature values of the hand shape of another hand image.

If the final feature values of each hand shape have been set in this way, the hand shape classifier 30 classifies each hand shape from the feature values of each hand shape at step S270, and stores information about the classified hand shape in the hand image storage unit 40 at step S280.

Of course, it is apparent that when a further hand image is subsequently input, previous feature values can be updated to feature values to which weights are applied, for the same hand shape.

Accordingly, the present invention is advantageous in that a hand is detected using the shape of the hand clenched to form a fist without using the detection of skin color or the like that decreases the precision of detection, thus enabling the hand to be easily and precisely detected using only feature points in a dark portion.

Further, the present invention is advantageous in that complicated hand shapes are classified using a hand classifier, thus not only enabling hand shapes to be easily detected via the comparison with input images, but also enabling hand shapes symmetrical to a registered hand shape to be easily detected while rotating hand shapes having different angles.

As described above, although the image-based hand detection apparatus and method according to the present invention have been described with reference to the attached drawings, the present invention is not limited by the embodiments and drawings disclosed in the present specification, and can be applied in various manners without departing from the scope of the present invention.

What is claimed is:

1. An image-based hand detection apparatus, comprising:
   a hand image detection unit configured to detect a hand image corresponding to a shape of a hand clenched to form a fist from an image input from a camera;
   a feature point extraction unit configured to extract feature points from an area, having lower brightness than a reference value, in the hand image detected by the hand image detection unit;
   an image rotation unit configured to compare the feature points of the detected hand image with feature points of hand images stored in a hand image storage unit, and then rotate the detected hand image or the stored hand images;
   a matching unit configured to compare the detected hand image with the stored hand images and then generate a result of the comparison; and
   a hand shape recognition unit configured to, if at least one of the stored hand images is matched with the detected hand image as the result of the comparison by the matching unit, select the at least one of the stored hand images as a matching hand image,
   wherein the feature point extraction unit is further configured to extract the number of edges, locations of the edges, and angles of the edges as the feature points of the detected hand image, the edges corresponding to areas with lower brightness than the reference value in the detected hand image.

2. The image-based hand detection apparatus of claim 1, wherein the hand image detection unit is further configured to set a window of an M×N size on a pixel unit for each frame of the input image, and detect the hand image of the M×N size.

3. The image-based hand detection apparatus of claim 2, wherein the hand image detection unit is further configured to determine whether a hand is included in the M×N size window of the input image, and if the hand is not included in the M×N size window, reduce a size of the input image step by step for detecting the hand image in the M×N size window.

4. The image-based hand detection apparatus of claim 1, wherein the hand shape recognition unit is further configured to recognize a front portion of the shape of the hand clenched to form a fist.

5. The image-based hand detection apparatus of claim 1, further comprising a hand shape classifier configured to, if all the stored hand images are not matched with the detected hand image as the result of the comparison by the matching unit, register the detected hand image.

6. The image-based hand detection apparatus of claim 5, wherein the hand shape classifier is further configured to compare a plurality of hand images with images including no hands, calculate feature values of a hand shape included in each of the hand images, and classify each hand shape based on the calculated feature values.

7. The image-based hand detection apparatus of claim 6, wherein the hand shape classifier is configured such that if an identical hand shape is present in hand shapes included in the respective hand images, weights are applied to feature values of the identical hand shape, and then feature values are recalculated.

8. The image-based hand detection apparatus of claim 1, further comprising a movement recognition unit configured to recognize hand movements from one or more hand shapes recognized by the hand shape recognition unit and recognize commands corresponding to the recognized hand movements.

9. An image-based hand detection method, comprising:
    detecting a hand image corresponding to a shape of a hand clenched to form a fist from an image input from a camera, and generating a detected hand image;
    extracting feature points from an area, having lower brightness than a reference value, in the detected hand image;
    comparing the feature points of the detected hand image with feature points of hand images stored in a hand image storage unit to rotate the detected hand image or the stored hand images, and comparing the detected hand image with the stored hand images to generate a result of the comparison; and
    if at least one of the stored hand images is matched with the detected hand image as the result of the comparison, selecting the at least one of the stored hand images as a matching hand image,
    wherein the extracting the feature points includes extracting the number of edges, locations of the edges, and angles of the edges as the feature points of the detected hand image, the edges corresponding to areas with lower brightness than the reference value in the detected hand image.

10. The image-based hand detection method of claim 9, wherein the detecting the hand image comprises setting a window of an M×N size on a pixel unit for each frame of the input image, wherein the hand image of the M×N size is detected.

11. The image-based hand detection method of claim 10, wherein the detecting the hand image further comprises:
    determining whether a hand is included in the M×N size window of the input image; and
    if the hand is not included in the M×N size window, reducing a size of the input image step by step for detecting the hand image in the M×N size window.

12. The image-based hand detection method of claim 9, wherein the selecting the at least one of the stored hand images as the matching hand image is configured to recognize a front portion of the shape of the hand clenched to form a fist.

13. The image-based hand detection method of claim 9, further comprising, if all the stored hand images are not matched with the detected hand image as the result of the comparison, inputting the detected hand image to a hand shape classifier and then registering the detected hand image.

14. The image-based hand detection method of claim 13, wherein the registering the hand image comprises:
    comparing a plurality of hand images with images including no hands, and calculating feature values of a hand shape included in each of the hand images;
    setting the calculated feature values as feature values of the hand shape included in each of the hand images; and
    classifying each hand shape based on the feature values of the hand shapes.

15. The image-based hand detection method of claim 14, further comprising:
    if an identical hand shape is present in hand shapes included in the respective hand images, applying weights to feature values of the identical hand shape, and then recalculating feature values; and
    setting the recalculated feature values as final feature values of the identical hand shape.

16. The image-based hand detection method of claim 9, further comprising:
    recognizing hand movements from hand shapes included in one or more hand images selected as the matching hand image; and
    recognizing commands corresponding to the hand movements.

* * * * *